(12) United States Patent
Lee et al.

(10) Patent No.: US 10,338,251 B2
(45) Date of Patent: Jul. 2, 2019

(54) METHOD AND APPARATUS FOR DIRECTIONAL DESIGNATURE

(71) Applicant: CGG SERVICES SA, Massy (FR)

(72) Inventors: Chang-Chun Lee, Houston, TX (US); Yunfeng Li, Sugar Land, TX (US); Suryadeep Ray, Houston, TX (US); Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 200 days.

(21) Appl. No.: 15/125,257

(22) PCT Filed: Mar. 24, 2015

(86) PCT No.: PCT/IB2015/000625
§ 371 (c)(1),
(2) Date: Sep. 12, 2016

(87) PCT Pub. No.: WO2015/145260
PCT Pub. Date: Oct. 1, 2015

(65) Prior Publication Data
US 2017/0184747 A1 Jun. 29, 2017

Related U.S. Application Data

(60) Provisional application No. 61/971,583, filed on Mar. 28, 2014.

(51) Int. Cl.
*G01V 1/36* (2006.01)
*G01V 1/38* (2006.01)

(52) U.S. Cl.
CPC ............... *G01V 1/36* (2013.01); *G01V 1/38* (2013.01); *G01V 2210/1423* (2013.01); *G01V 2210/1427* (2013.01); *G01V 2210/20* (2013.01); *G01V 2210/50* (2013.01); *G01V 2210/59* (2013.01)

(58) Field of Classification Search
CPC .......... G01V 1/36; G01V 1/38; G01V 2210/59
See application file for complete search history.

(56) References Cited

U.S. PATENT DOCUMENTS

| 2003/0168277 A1* | 9/2003 | Hopperstad | G01V 1/006 181/111 |
| 2006/0193204 A1* | 8/2006 | Davies | G01V 1/368 367/24 |
| 2006/0256658 A1* | 11/2006 | Christie | G01V 1/364 367/43 |
| 2009/0238036 A1* | 9/2009 | Robertsson | G01V 1/3808 367/24 |

(Continued)

FOREIGN PATENT DOCUMENTS

EP  2626727 A2  8/2013

OTHER PUBLICATIONS

Landro et al., (Marine Seismc source Part1, 2010.*

(Continued)

*Primary Examiner* — Mohammad K Islam
(74) *Attorney, Agent, or Firm* — Patent Portfolio Builders PLLC (57) ABSTRACT

Methods and apparatuses for directional designature in shot domain are provided. Azimuth and take-off angles are calculated for each record in the seismic data. Directional designature is then applied to the seismic data using a source signature dependent on the azimuth and take-off angles.

20 Claims, 10 Drawing Sheets

(56) References Cited

U.S. PATENT DOCUMENTS

| | | | |
|---|---|---|---|
| 2010/0002539 A1* | 1/2010 | Kragh | G01V 1/364 367/23 |
| 2011/0017543 A1* | 1/2011 | Hopperstad | G01V 1/38 181/113 |
| 2011/0176386 A1* | 7/2011 | Lapilli | G01V 1/282 367/73 |
| 2012/0087207 A1* | 4/2012 | Kostov | G01V 1/38 367/20 |
| 2013/0100770 A1* | 4/2013 | Diller | G01V 1/288 367/38 |
| 2013/0201791 A1* | 8/2013 | Parkes | G01V 1/364 367/24 |
| 2014/0036624 A1 | 2/2014 | Tonchia | |
| 2014/0043936 A1* | 2/2014 | Poole | G01V 1/38 367/21 |
| 2014/0278120 A1* | 9/2014 | Kahn | G01V 1/282 702/18 |
| 2015/0226867 A1* | 8/2015 | Tonchia | G01V 1/3808 367/20 |
| 2015/0253444 A1* | 9/2015 | Hu | G01V 1/282 702/14 |

OTHER PUBLICATIONS

International Search Report in related International Application No. PCT/IB2015/000625, dated Sep. 15, 2015.

Written Opinion of the International Searching Authority in related International Application No. PCT/IB2015/000625, dated Sep. 15, 2015.

L. Hatton et al., "The Effects of Source Array Crossline Directivity on 3D Migration", First Break, Sep. 1991, vol. 9, No. 9, pp. 427-431.

C. Lacombe et al., "Target Oriented Directive Designature", 70th EAGE Conference & Exhibition, Rome, Italy, Jun. 9-12, 2008.

M.M. Loveridge et al., "Effects of Marine Source Array Directivity on Seismic Data and Source Signature Deconvolution", First Break, Jul. 1984, pp. 16-22.

F. Mandroux et al., "Staggered Marine Acquisition Design for Complex Imaging", SEG Annual Meeting, Houston, Texas, 2013, pp. 26-30.

G.E. Parkes et al., "The Signature of an Air Gun Array: Computation from Near-Field Measurements Including Interactions—Practical Considerations", Geophysics, Feb. 1984, vol. 48, No. 2, pp. 105-111.

G. Poole et al., "Shot-to-Shot Directional Designature Using Near-Field Hydrophone Data", SEG Annual Meeting, Houston, Texas, 2013, pp. 4236-4240.

M.H. Safar, "Single Water Gun Far-Field Pressure Signatures Estimated from Near-Field Measurements", Geophysics, Feb. 1985, vol. 50, No. 2, pp. 257-261.

C.A. Van Der Schans et al., "Angular-Dependent Signature Deconvolution", SEG Technical Program Expanded Abstracts, 1983, pp. 433-436.

P. Wang et al, "Premigration Deghosting for Marine Towed Streamer Data Using a Bootstrap Approach", SEG Annual Meeting, Las Vegas, Nevada, 2012.

A.M. Ziolkowski et al., "Marine Seismic Sources: QC of Wavefield Computation from Near-Field Pressure Measurements", Geophysical Prospecting, 1997, vol. 45, pp. 611-639.

A. Ziolkowski et al., "The Signature of an Air Gun Array: Computation from Near-Field Measurements Including Interactions", Geophysics, Oct. 1982, vol. 47, No. 10, pp. 1413-1421.

* cited by examiner

METHOD AND APPARATUS FOR DIRECTIONAL DESIGNATURE

CROSS REFERENCE TO RELATED APPLICATIONS

This application is a National Stage of International Application No. PCT/IB2015/000625, filed Mar. 24, 2015, which claims priority and benefit from U.S. Provisional Patent Application No. 61/971,583, filed Mar. 28, 2014, for "Directional designature using a bootstrap approach," the contents of which are incorporated in their entirety herein by reference.

BACKGROUND

Technical Field

Embodiments of the subject matter disclosed herein generally relate to designature of marine seismic data or, more specifically, to performing azimuth and take-off angle dependent designature in shot domain.

Discussion of the Background

In geophysical prospecting, gas and oil reservoirs are sought by performing seismic surveys of sedimentary rock formations. Variations of seismic wave propagation velocity from one formation layer to another cause reflected, refracted and transmitted waves, some of which are detected by seismic receivers after traveling through the explored formations.

Figure 1:
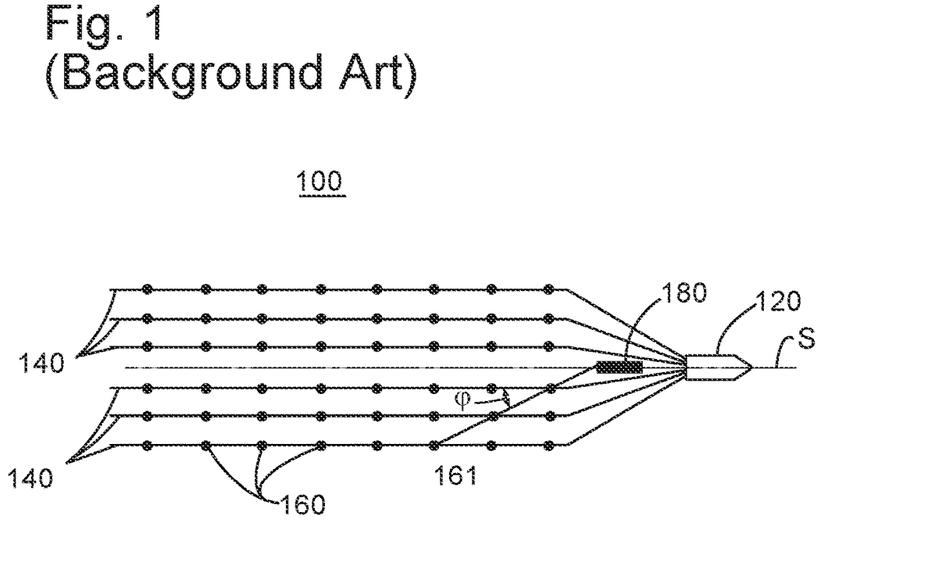
FIG. 1 illustrates a conventional narrow azimuth data acquisition system.

Traditionally, marine seismic data was acquired using one vessel towing a source and one or more streamers (i.e., cables carrying receivers). FIG. 1 is a bird's-eye view of such a conventional data acquisition system 100. The term "marine" is not limited to sea or ocean environments, but such systems may be used in any large bodies of water (e.g., freshwater lakes). Data acquisition system 100 includes a ship 120 towing plural streamers 140 that form a "spread." The streamers may extend over kilometers behind ship 120 in the towing (in-line) direction, while cross-line distance (perpendicular to the in-line direction, in the horizontal plane) between adjacent streamers may be about 100 m. Receivers 160 (only a few are labeled) are disposed along streamers 140. Ship 120 also tows a source 180 (which may include plural individual sources such as air-guns) configured to generate a seismic (pressure) signal.

An in-line distance (i.e., parallel to towing direction) in the horizontal plane, between source 180 and the first receivers on streamers 140, may be a few hundred meters, while streamers' length may be up to 10 kilometers. Seismic signals generated by source 180 and propagating downward penetrate the seafloor and may be redirected when encountering layer interfaces (not shown in FIG. 1) inside the explored underground structure. Parts of the seismic signals emerging from the seafloor (i.e. after traveling through the explored formation) are detected by receivers 160.

Data acquired with system 100 in FIG. 1 is characterized by a narrow, limited azimuth angle range. An azimuth angle corresponding to a detected signal (e.g., φ for receiver 161 in FIG. 1) is defined in a horizontal plane, and is the angle between a line in the towing direction passing through the source's position (e.g., sail line S in FIG. 1) at the moment of the shot (i.e., when the signal has been generated), and a line connecting the source's position at the moment of the shot, and the receiver's position at the moment at which it detects a portion of the signal. If a seismic detector were positioned directly behind the source in the towing direction, the azimuth angle would have been 0°. The receivers at the front of the outermost streamers in the spread may have an azimuth angle of up to ±75°, but azimuth angles for the other receivers and on other streamers rapidly decrease to be mostly in the range of ±10°.

In order to achieve a stronger signal, the seismic source includes plural individual sources (e.g., air-guns) activated (e.g., fired) in a predetermined sequence. Each individual source has its own characteristics. For example, an air-gun is characterized by a minimum phasing and bubble energy. The signal generated by the source incorporates individual sources' contributions and has a shape (e.g., amplitude versus time) that varies with the distance from the source until, at a great enough distance from the source, the signal starts having a stable shape. This stable shape is known as the source signature. Once the signal's shape becomes stable, the signal's energy decreases inversely proportional to the distance from the source. The region where the signal's shape no longer changes with distance is known as the "far-field," in contrast to the "near-field" region where the shape varies.

The signal penetrating the seafloor is thus characterized by the source signature, e.g., P(t). The signal recorded by a receiver, D(t), is considered to be a convolution of an impulse response, G(t) (which is determined by the explored formation's reflectivity), with attenuation E(t) and the source signature, P(t), plus some noise N(t):

$$D(t)=[P(t)*G(t)*E(t)]+N(t). \qquad (1)$$

Since both the impulse response and the attenuation are dependent on the explored formation's structure, a source signature's impact on the seismic data is removed during data processing (i.e., designature of the data). The source signature P(t) is measured or otherwise determined. Designature of the data is achieved by convolving the inverse of P(t) with D(t).

The source signature depends on the azimuth angle φ and the take-off angle α characterizing the data. This dependence is known as directivity. Conventionally, since, as discussed above, most of the data is characterized by azimuth angles in the range of ±10°, the same (i.e., a single) source signature has been conventionally used for designature, disregarding the source signature dependence of the azimuth angle.

Figure 2:
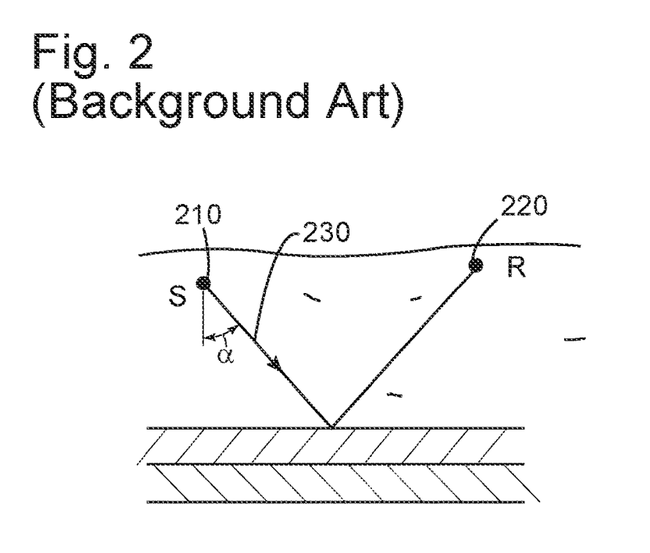
FIG. 2 illustrates definition of the take-off angle.

As illustrated in FIG. 2, the take-off angle α for a source 210 and a receiver 220 is the angle with a vertical line made by a trajectory 230 of the signal as emitted by the source and partially detected by the receiver. The spatial extent of the source causes far-field directivity with take-off angle, while the source's asymmetry relative to the towing direction leads to the directivity with azimuth. Thus, the signature of the emitted signal varies both with azimuth and take-off angle.

To minimize source directivity, different source designs have been investigated, leading to a current design of a source shorter and narrower than in past decades, for which the source directivity effect decreases. With the current design, using a single source signature is almost correct for data with limited offset (i.e., distance from the source's position to the receiver's position) ranges and narrow-band spectra. However, because the acquisition technology extended azimuth coverage from narrow azimuth (NAZ) to wide azimuth (WAZ), and now to full azimuth (FAZ), ultra-long offset, and broadband, designature using a single source signature is no longer sufficient.

Figure 3:
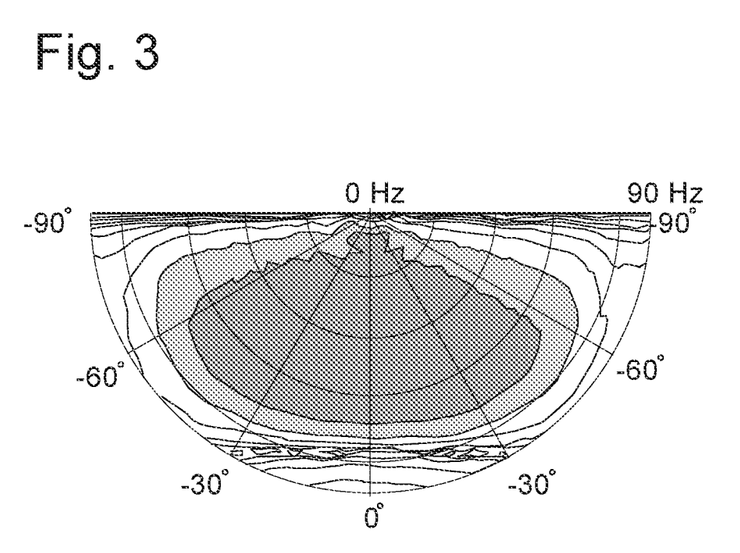
FIG. 3 is a graph of spectral content of a source signature's dependence on the take-off angle for a 0° azimuth angle.
Figure 4:
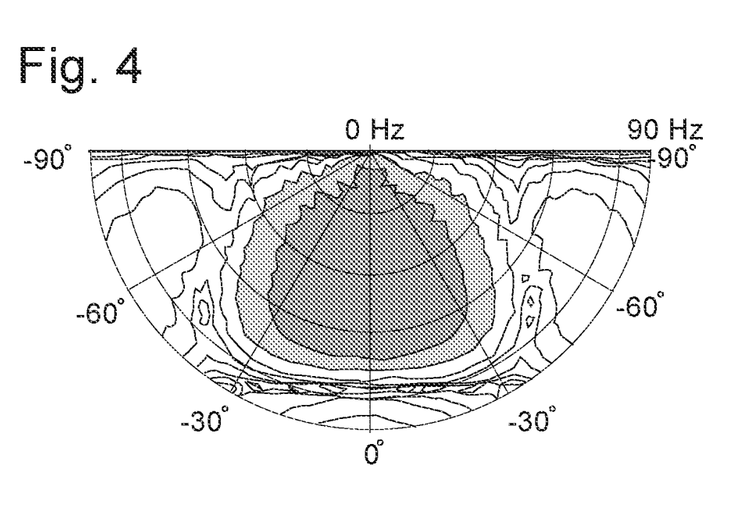
FIG. 4 is a graph of spectral content of a source signature's dependence on the take-off angle for a 90° azimuth angle.

FIGS. 3 and 4 are graphical illustrations of source directivity for an azimuth angle of 0° and 90°, respectively. The source whose signature is illustrated in these graphs includes four arrays (i.e., substantially parallel towed cables) along which at seven substantially similar cross-lines positions are placed a total of 34 active air-guns with a total volume of 6,470 in$^3$. In FIGS. 3 and 4, frequency increases along radii up to 90 Hz, and take-off angle varies around the semi-circular graph. Variations in intensity (i.e., amplitude), are seen in the patterns as differences in gray-scale. For azimuth 0° (in FIG. 3), the source directivity has a bigger variation in the spectrum domain when the take-off angle becomes larger than 50°, while for azimuth 90° (in FIG. 4), the spectrum begins varying from take-off angle 30°.

Hydrophones placed close (e.g., 1-2 m above each air-gun) have been used to estimate and monitor source signature shot-by-shot. Recently, (see U.S. Patent Application Publication No. 2014/0043936 by Poole et al., which is incorporated herewith in its entirety by reference) a method using these hydrophone measurements applies a shot-to-shot directional designature. The method performs a τ-p transform on the data in the common receiver domain and applies the corresponding directional designature filter on the p traces that represent the energy from different take-off angles. This method is affected by the sparseness of the data in the common receiver domain.

It is desirable to develop methods able to perform designature of marine seismic data that take into consideration the source signature's directivity and mitigate drawbacks of existing methods.

SUMMARY

A method for shot-to-shot directional designature addresses the potential issues of source designature instability and directivity by obtaining a source signature, which is dependent on azimuth and take-off angles. The method may use a bootstrap approach to derive the take-off angles, and may then apply directional filters in the shot domain. This type of signature can remove bubble effect more effectively and makes primary energy more coherent among different azimuths.

According to an embodiment, there is a processing method starting by receiving marine seismic data recorded by receivers following a shot of a source. The method then includes calculating azimuth angles and take-off angles relative to the source for records in the marine seismic data, acquired by different receivers following the shot, and obtaining a source signature related to the shot and dependent on the azimuth angles and the take-off angles. The method further includes applying directional designature to the records using the source signature.

According to another embodiment, there is a data processing apparatus having an interface and a data processing unit. The interface is configured to receive marine seismic data recorded by receivers following a shot of a source. The data processing unit is configured to calculate azimuth angles and take-off angles relative to the source for records in the marine seismic data acquired by different receivers, to obtain a source signature related to the shot and dependent on the azimuth angles and the take-off angles, and to apply directional designature to the records using the source signature.

According to yet another embodiment, there is a computer readable recording medium non-transitorily storing executable codes, which, when executed by a computer, make the computer perform a method for directional designature. The method starts by receiving marine seismic data recorded by receivers following a shot of a source. The method then includes calculating azimuth angles and take-off angles relative to the source for records in the marine seismic data, acquired by different receivers, and obtaining a source signature related to the shot and dependent on the azimuth angles and the take-off angles. The method further includes applying directional designature to the records using the source signature.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to marine data acquisition and processing. However, similar embodiments and methods may be used for a land data acquisition system and for surveys using electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Some of the following embodiments perform designature of marine seismic data recorded by receivers. An azimuth angle (defined based on the in-line and cross-line distance between the source and the receiver generating a record following the shot) and a take-off angle are then associated with each record. A record is a series of amplitude versus time pairs of values recorded by a receiver following a shot of a source. The source may be (but it is not limited to) an air-gun source. A source signature dependent on the azimuth and the take-off angles is obtained (i.e., estimated or received). The source signature may be obtained shot-by-shot or when considered necessary (e.g., when changes of the source and/or data acquisition configuration occurs). A directional designature is the applied using this source signature. The data obtained after applying the directional designature is further processed to yield an image of an explored formation under the seafloor.

Figure 5:
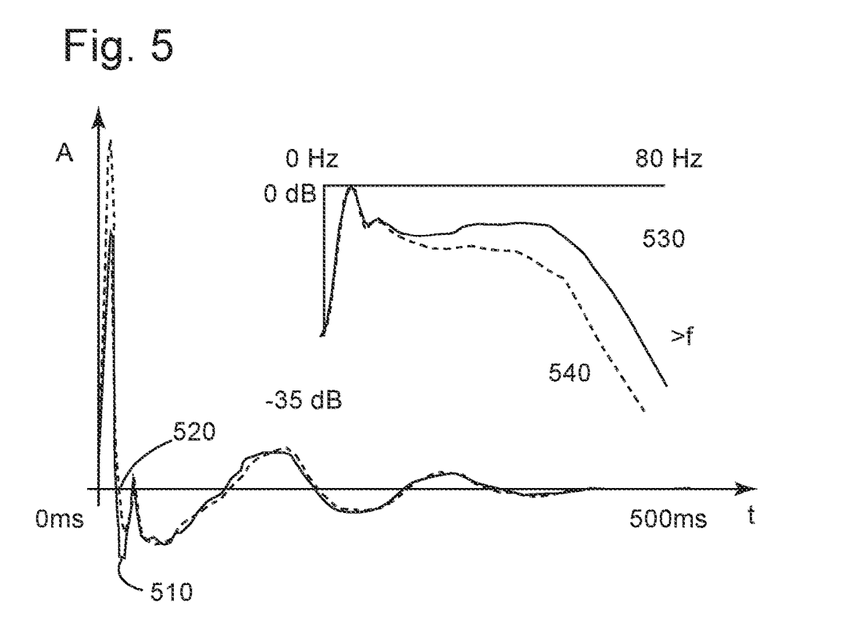
FIG. 5 is an image including two graphs (a first one being amplitude versus time, and a second one in the upper right corner of the first one being amplitude versus frequency)

Near-field sensor measurements (which are often acquired using hydrophones, but other sensors may also be employed) may be used to obtain the source signature. The near-field measurements may be received separately from the marine seismic, or incorporated, as appropriately time-wise, in the marine seismic data (at the time of the survey or later when data is assembled and/or pre-processed). Near-field hydrophones are often installed 1-2 m above each air-gun of a source to monitor the air-gun's operation (e.g., to detect if the air-gun misfired) and/or the air-gun's firing moment. As described in the article, "The signature of an air gun array: Computation from near-field measurements including interactions—Practical considerations" by Ziolkowski et al., published in *Geophysics*, 48(2), 1984, pp 105-111, near-field hydrophone data may be used to derive source signatures. The isotropic point source signatures of each air-gun in the source, known as notional signatures, can be derived from the near-field hydrophone measurements. If the directional information (i.e., azimuth angles and take-off angles) is provided, source signatures can be obtained by beam-forming using the notional signatures. For example, FIG. 5 illustrates two different source signatures (in time domain and in frequency domain) without free surface ghost. Lines 510 and 530 correspond to the vertical (take-off angle=0°) source signature, and lines 520 and 540 correspond to the source signature (take-off angle=50° and azimuth=0°). The difference of bubble energy (proportional with the square of the amplitude) and spectrum (i.e., frequency versus amplitude profile) are noticeable between these two source signatures.

Figure 6:
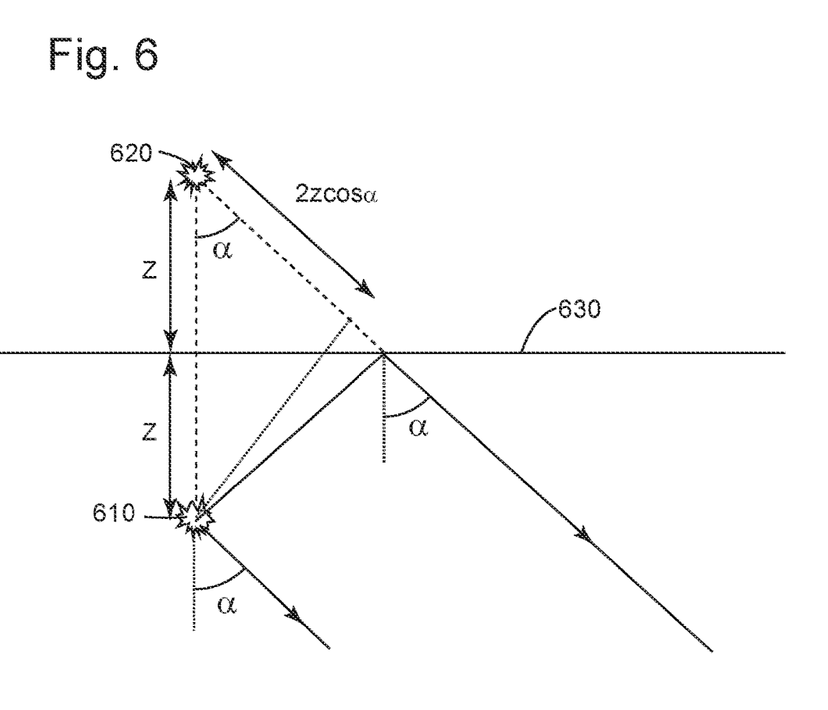
FIG. 6 illustrates a method for extracting a take-off angle.

Knowledge of the take-off angles and azimuth angles associated with each record in the data is necessary to apply directional designature (i.e., using an angle-dependent source signature). As illustrated in FIG. 6, the take-off angle α can be obtained if the source side ghost-delay time Δt and air-gun's depth z are known. The delay time Δt between the primary and ghost can be expressed as:

$$\Delta t = 2z \cos \alpha / v_w \quad (2)$$

where $v_w$ is the water velocity. The take-off angle can then be calculated as:

$$\cos \alpha = 0.5 \Delta t v_w / z \quad (3)$$

The source side ghost-delay time Δt can be extracted from the data using a bootstrap method as, for example, described in the article, "Premigration deghosting for marine towed streamer data using a bootstrap approach," by Wang et al., published in $82^{nd}$ Annual International Meeting, SEG, 2012, Expanded Abstracts, pp. 1-5 (the contents of which is incorporated herewith by reference in its entirety). This bootstrap method, which self-determines parameters for shot deghosting, may be used for deriving take-off angles. The recorded data in shot domain is first used to create mirror data (see source 610, mirror source 620 and water surface 630 in FIG. 6). Then, both the recorded and mirror data are jointly inverted to obtain Δt, which is then used in equation 3 to calculate a take-off angle. This take-off angle paired with the azimuth angle estimated from shot and receiver locations (at the time when the source is fired and when the signal is detected, respectively) enables estimating the source signature by beam-forming using the notional signatures.

Figure 7A:
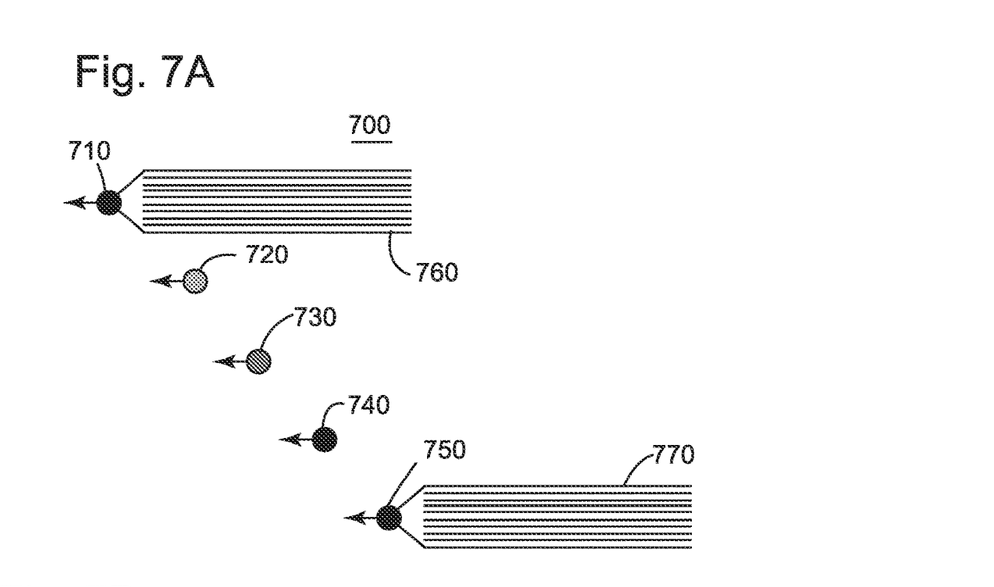
FIG. 7A represents the layout of a data acquisition system acquiring azimuth data whose azimuth coverage is illustrated in FIG. 7B.

FIGS. 9-17 represent data recorded using a wide azimuth data acquisition system whose layout is illustrated in FIG. 7A. Five air-gun sources 710-750 were towed at staggered positions to provide data with ultra-long offsets (up to 18 km) and full azimuth coverage within a 9 km offset. A super shot is a term associated with a sequence of shots from all sources to cover many (most) azimuth angles. In-line distance from sources 710 and 750 to spreads 760 and 770, respectively, was about 300 m. In-line interval between adjacent sources (e.g., 710 to 720, 720 to 730, etc.) was about 2.1 km, and cross-line distances between adjacent sources were about 1.2 km. The spreads included about 10 variable-depth streamers with 120 m there-between. This layout is merely exemplary and it is not intended to be limiting.

Figure 7B:
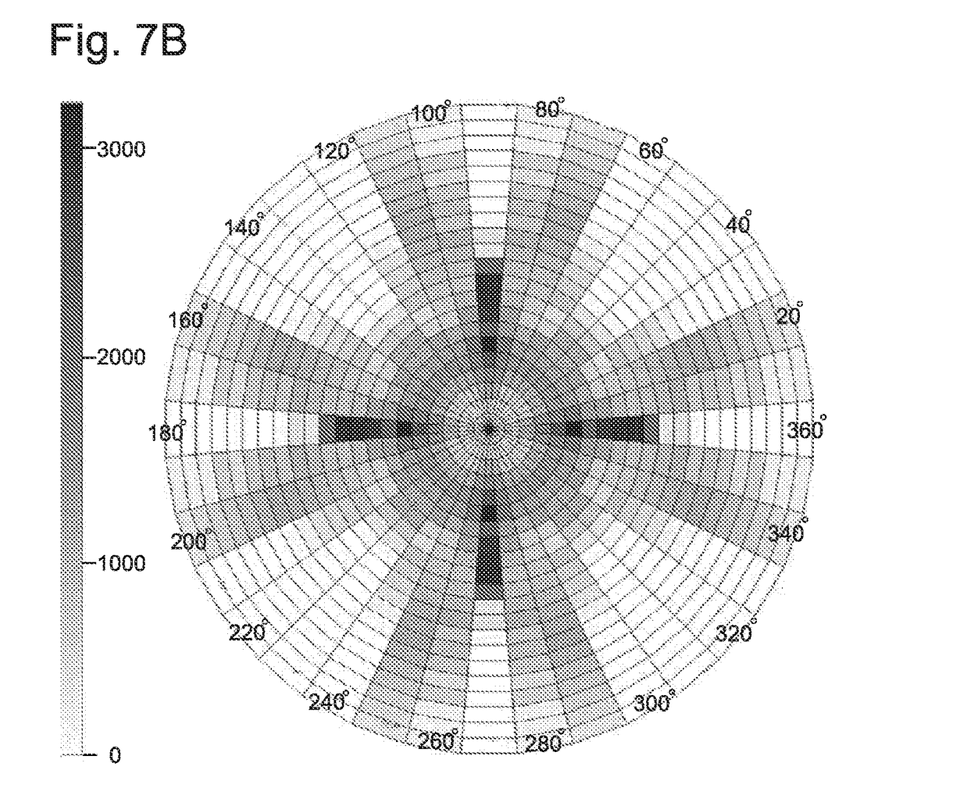

FIG. 7B is a circular graph illustrating azimuth coverage achieved with this data acquisition system towed back and forth. The circles correspond to distance from the source in increments of 1 km, and the azimuth is divided in 10° sectors, the shade of gray for each sector corresponding to the amount of records therein.

Figure 8:
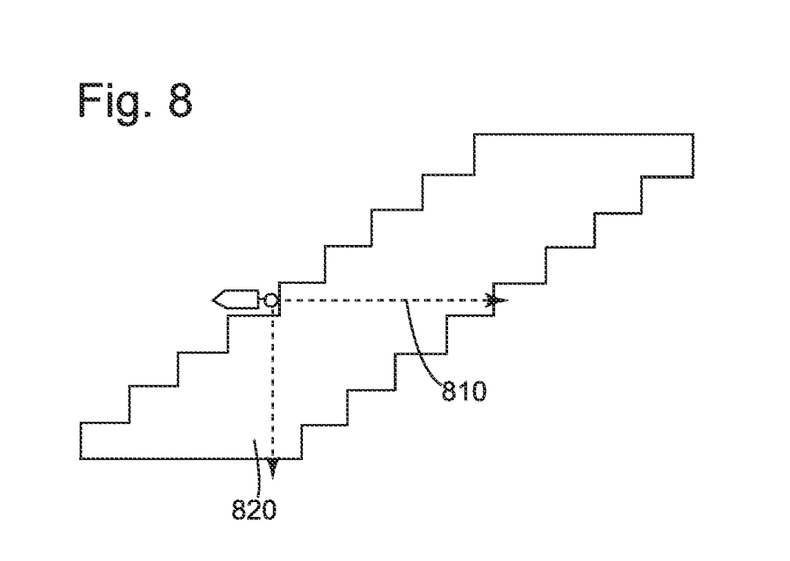
FIG. 8 is a shot/receiver map of one super shot (i.e., data is acquired with the system in FIG. 7A)
Figure 9:
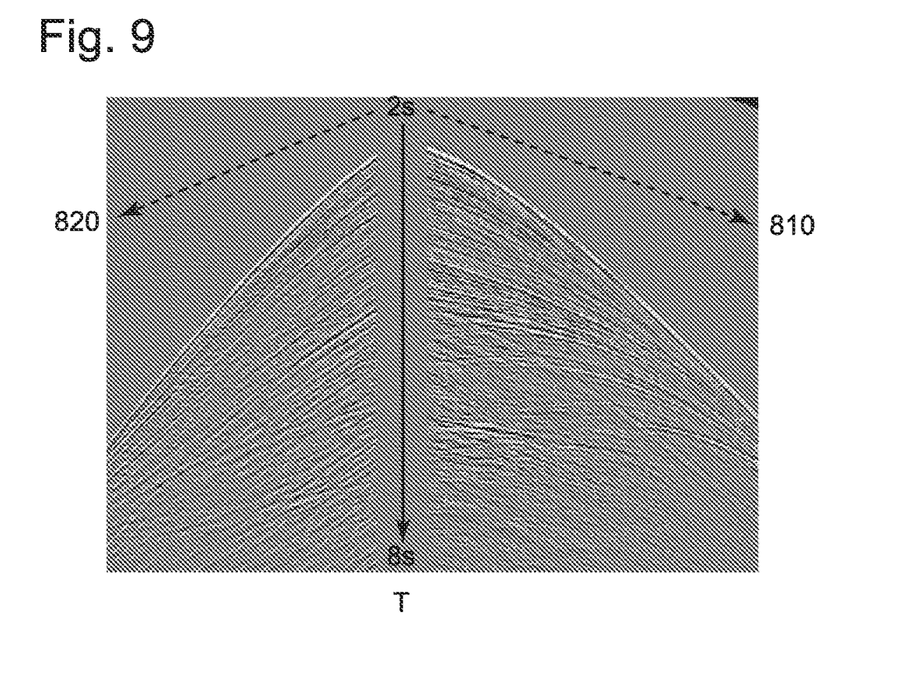
FIG. 9 represents raw data belonging to the super shot in FIG. 8.
Figure 10:
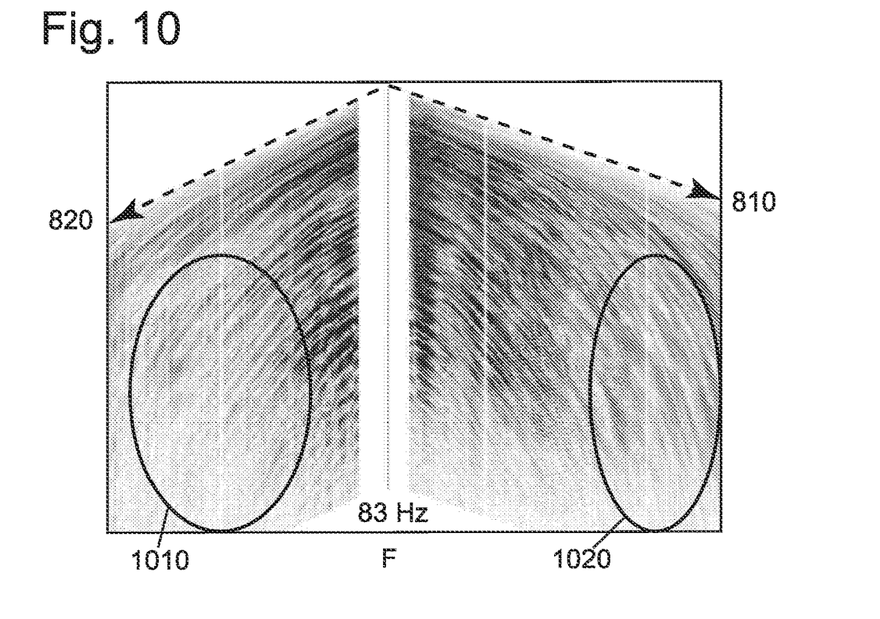
FIG. 10 represents data in FIG. 9 after applying conventional designature.
Figure 11:
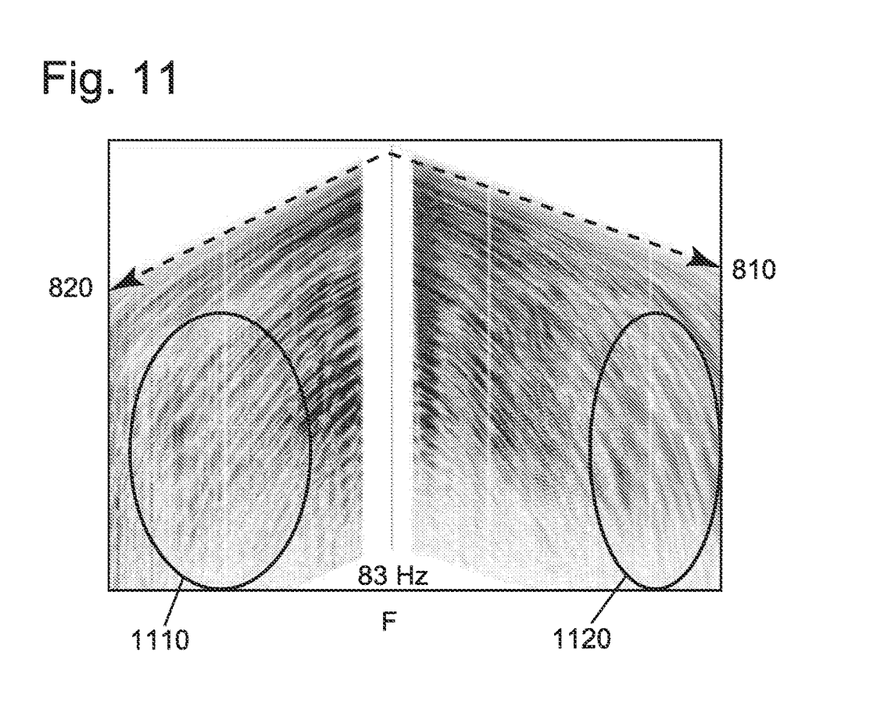
FIG. 11 represents data in FIG. 9 after applying directional designature according to an embodiment.

FIG. 8 is a shot/receiver map of one super shot in the system illustrated in FIG. 7A. FIGS. 9-11 represent data corresponding to line 810 of azimuth angle 0° (i.e., along the towing direction) and to line 820 of azimuth angle 90°.

FIG. 9 illustrates the raw data before designature as time (T, the vertical axis) versus inline or cross-line position (X, axes other than vertical). In the right-side of the time axis in FIG. 9, the position axis corresponds to line 810, and in the left-side of the time axis in FIG. 9, the position axis corresponds to line 820. FIG. 10 represents the same data as in FIG. 9 in frequency (F, vertical) versus position (X) domain after the conventional designature method (not considering the source directivity) has been applied. The gray shades correspond to different amplitudes.

FIG. 11 is the same data and in the same format as FIG. 10, after applying directional designature in shot domain according to an embodiment.

A comparison of FIGS. 10 and 11 (see 1010 versus 1120) reveals that the resulting data is richer in information in high frequency (50-80 Hz range) when using directional designature than the conventional designature method. It is also noticeable that directional designature has a bigger impact for the 90° azimuth angle (left-side, 1010 vs. 1110) than for the 0° azimuth angle (right-side, 1020 vs. 1120), which is consistent with the source directivity spectra illustrated in FIG. 5.

Figure 12:
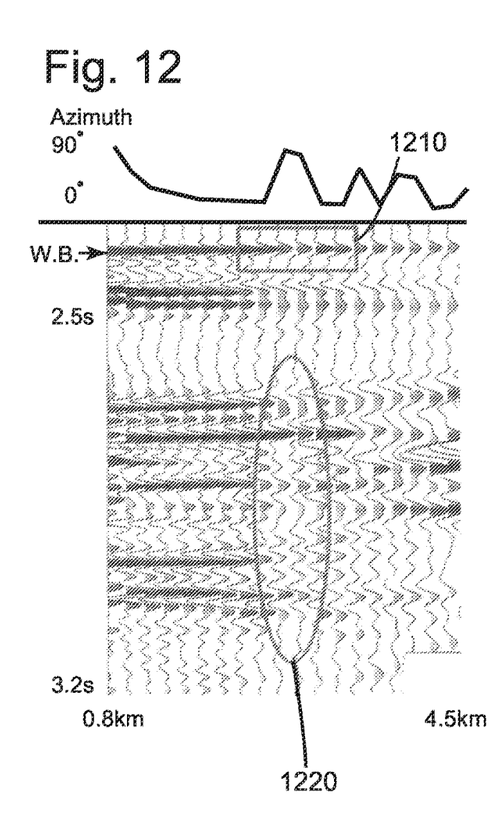
FIG. 12 illustrates traces of a common middle point gather.
Figure 13:
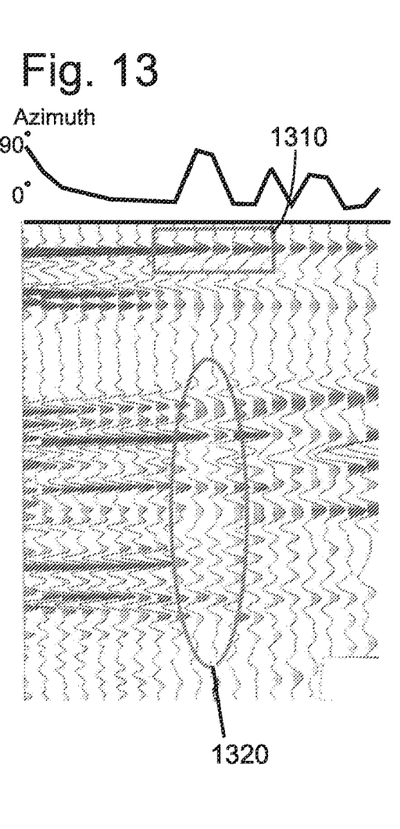
FIG. 13 illustrates the traces in FIG. 12 after applying conventional designature.
Figure 14:
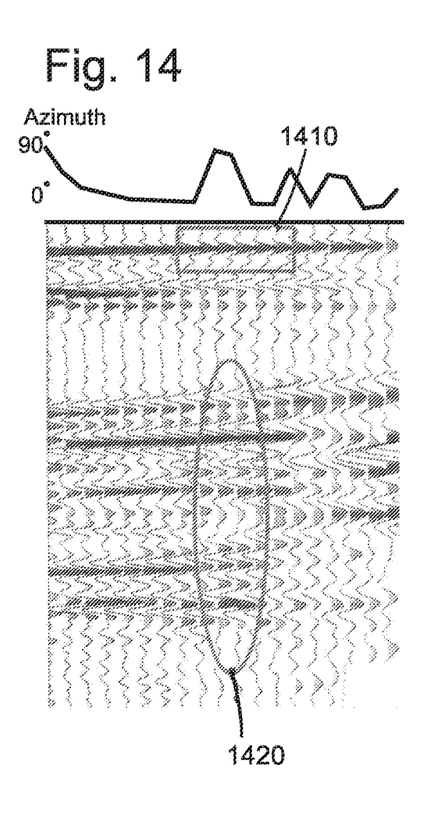
FIG. 14 illustrates the traces in FIG. 12 after applying directional designature according to an embodiment.

To further illustrate the improvements provided by using methods according to the above-described embodiments instead of the conventional method, FIGS. 12-14 illustrate traces of a common middle point (CMP) gather. Time flows from the upper to the lower part of the traces, and the departure from vertical of each trace corresponds to the detected signal amplitude. The first signal for each trace is the water bottom (W.B.) reflection. The horizontally running line above the traces represents azimuth angles (varying between 0° and 90°) corresponding to each of the traces. FIG. 12 illustrates the raw data, FIG. 13 represents data in FIG. 12 after applying the conventional designature method, and FIG. 14 represents the same data after applying the directional designature according to an embodiment.

In FIG. 12, one can observe (see 1210 and 1220 areas) that the traces are inconsistent among different azimuths. FIG. 13 indicates (see 1310 and 1320 areas) that the conventional designature (which uses a single signature) is unable to properly correct this inconsistency. In contrast, as observed in FIG. 14 (see 1410 and 1420 areas), the directional designature provides more consistency among different azimuths. Thus, the directional signatures represent the source signatures more accurately. This improvement may be useful to better predict a multiple model and thereby reduce residual multiples in the processed data.

Figure 15:
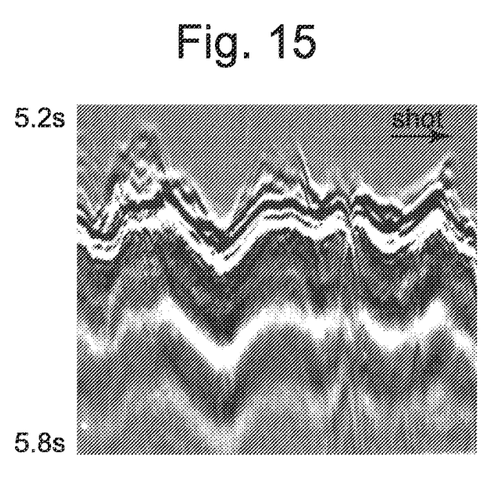
FIG. 15 represents raw data in a common channel domain.
Figure 16:
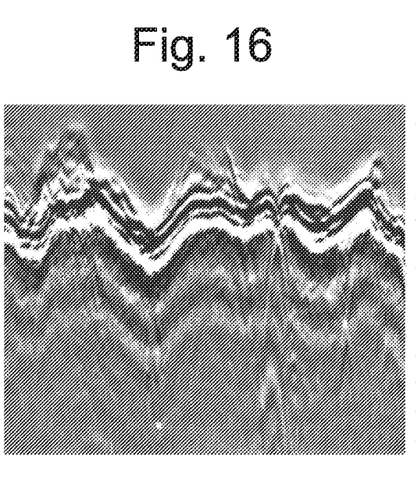
FIG. 16 illustrates the data in FIG. 15 after applying conventional designature.
Figure 17:
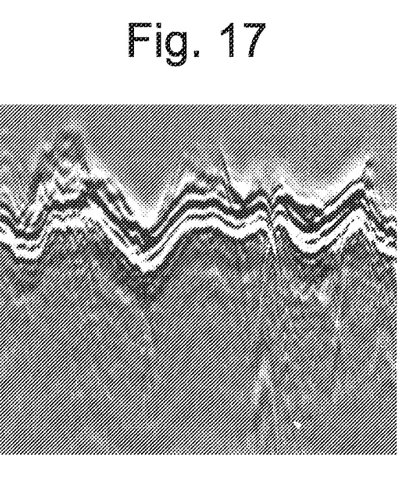
FIG. 17 illustrates the data in FIG. 15 after applying directional designature according to an embodiment.

FIGS. 15-17 indicate that directional designature methods also properly remove the bubble energy because the shot-by-shot directional far-field signatures better represent the source signatures in the recorded seismic data. FIG. 15 represents raw data in a common channel domain, i.e., time vertically versus shot number horizontally (offset ~7 km), with the shades of gray illustrating different amplitudes. In this representation, the bubble energy yields the echoes in the lower part of the graph. FIG. 16 represents the same data as in FIG. 15 after applying the conventional designature method, and FIG. 17 also represents the same data as in FIG. 15 after applying the designature method according to an embodiment. Comparing features in the lower parts of FIGS. 15-17 reveals that the directional designature attenuates the bubble energy much better than the conventional designature.

In view of FIGS. 12-17, an advantage of directional designature is that data becomes more cohesive along all azimuths and take-off angles.

Figure 18:
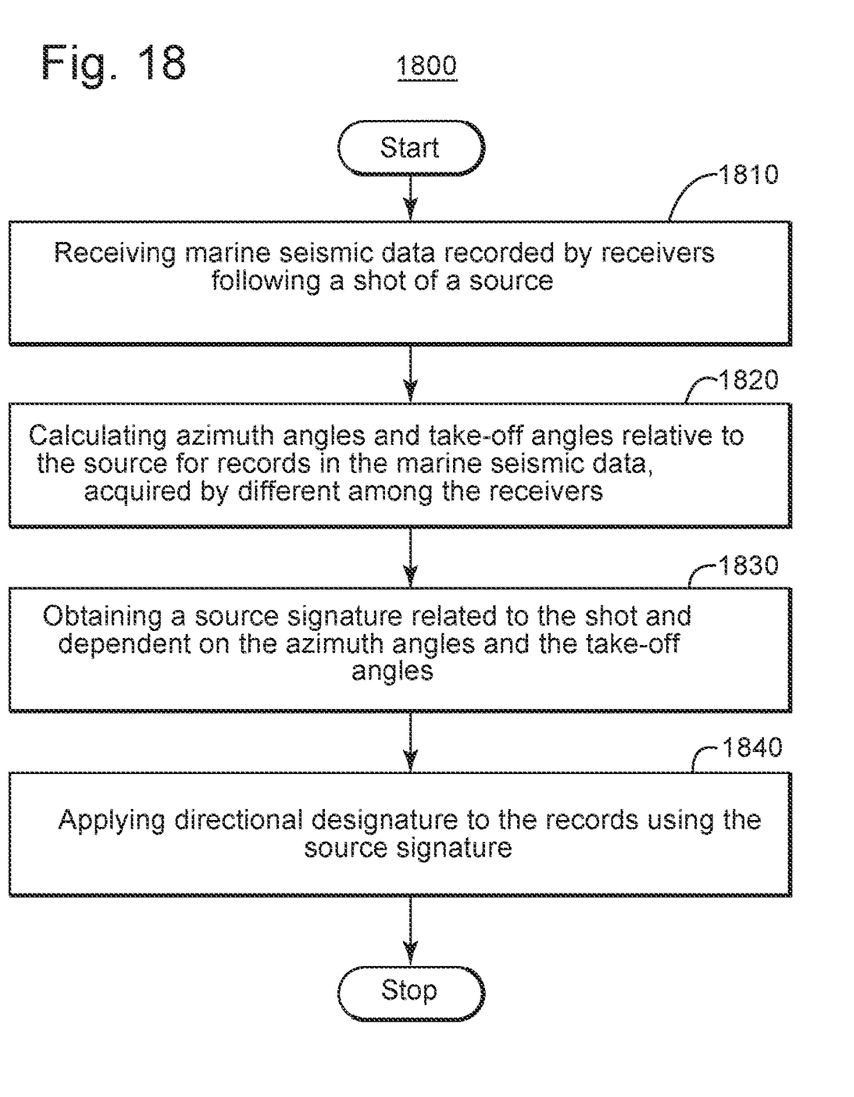
FIG. 18 is a flowchart of a method for directional designature according to an embodiment.

FIG. 18 is a flow diagram of a method 1800 for directional designature according to an embodiment. Method 1800 includes receiving marine seismic data recorded by receivers following a shot of a source (may be an air-gun source or other type of source), at 1810. Method 1800 further includes calculating azimuth angles and take-off angles relative to the source for records in the marine seismic data acquired by different receivers, at 1820.

Method 1800 also includes obtaining a source signature dependent on the azimuth angles and the take-off angles at 1830. In one embodiment, the source signature is obtained using near-field measurements, which may be acquired by hydrophones placed in water, above (e.g., 1-2 m) each air-gun of the source. In another embodiment, the source signature is derived using modelled notional sources. Method 1800 finally includes applying directional designature to the records using the source signature, at 1840. Directional designature means that for each record, it is used a record source signature inferred from the source signature based on the azimuth and the take-off angle associated with the record.

In one embodiment, one or more of the take-off angles is/are calculated using a source-side ghost delay time obtained using a bootstrap approach. The take-off angles may also be calculated using the source-side ghost delay, $\Delta t$, a depth of the air-gun source z and a signal propagation velocity in water, $v_w$ (e.g., formula 3). The source-side ghost delay may be obtained by jointly inverting mirror data (generated for a source located symmetric to the air-gun source relative to water surface) and the marine seismic data.

If the marine seismic data correspond to plural shots of the air-gun, then steps 1820-1840 are performed shot-by-shot. If the marine seismic data includes second records related to another shot of another source, method 1800 may further include performing steps 1820-1840 for the second records.

If the marine seismic data is acquired as a continuous time recording, and, the marine seismic data may be pre-processed to separate records related to each shot, before performing steps 1820-1840. Note that if the data is blended data (i.e., with time-overlapping records), then the pre-processing includes "de-blending."

Figure 19:
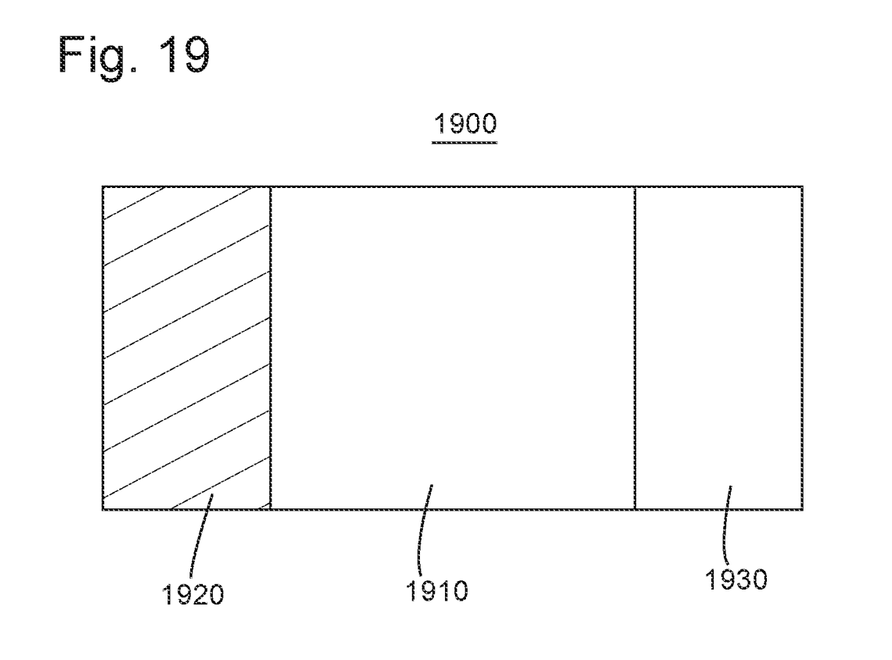
FIG. 19 is a data processing apparatus according to an embodiment.

FIG. 19 illustrates a block diagram of a data processing apparatus 1900 usable for directional designature according to an embodiment. Hardware, firmware, software or a combination thereof may be used to perform the various steps and operations. Apparatus 1900 includes one or more data processors 1910, coupled to an interface 1920 and a memory 1930.

Interface 1920 may include one or more user interface mechanisms such as a mouse, keyboard, microphone, touch pad, touch screen, voice-recognition system, etc. Interface 1920 may be used to receive marine seismic data recorded by receivers, and near-field sensor measurements.

Data processor(s) 1910 may be controlled by a user via interface 1920 (i.e., data processing parameters may be input by the user via the interface). Data processor(s) 1910 is/are configured to calculate azimuth angles and take-off angles relative to the source for records in the marine seismic data, the records having been acquired by different receivers following the shot. Data processor(s) 1910 is/are further configured to obtain a source signature dependent on the azimuth angles and the take-off angles. Data processor(s) 1910 is/are also configured to apply directional designature to the records using the source signature.

Data processor(s) 1910 may be configured to calculate one or more of the take-off angles using a source-side ghost delay time obtained using a bootstrap approach. In one embodiment, data processor(s) 1910 calculate the at least one of the other take-off angles using the source-side ghost delay, $\Delta t$, a depth z of the source and a signal propagation velocity $v_w$ in water (e.g., formula 3).

Data processor(s) 1910 may be configured to generate mirror data for a source located symmetric to the source relative to the water surface, and to obtain the source-side ghost delay by jointly inverting the mirror data and the marine seismic data.

If the marine seismic data corresponds to more than one shot, data processor(s) 1910 may be configured to perform calculating, obtaining and applying steps of method 1800, on a shot-by-shot basis. If the marine seismic data may include second records related to shots of another source, data processor(s) 1910 may be configured to calculate other azimuth angles and other take-off angles for the second records, to obtain a second source signature dependent on the other azimuth angles and the other take-off angles, and to apply the directional designature to the second records using the second source signature.

If the marine seismic data is blended data acquired as a continuous time recording, and, the data processing unit may be further configured to deblend the marine seismic data (i.e., generate separate records for each shot) before performing calculating, obtaining and applying steps.

Interface 1920 may also include a display, which may be any type of known display or presentation screen, such as LCD, plasma displays, cathode ray tubes (CRT), etc. Data processor(s) 1910 may control the display to show images of the raw data and/or data after applying the directional designature.

Memory 1930 may include a random access memory (RAM), a read-only memory (ROM), CD-ROM, removable media and any other forms of media capable of storing data. Memory 1930 may store the received marine seismic data, and/or data resulting after applying the directional designature. Memory 1930 may also store executable codes which, when executed on a processor, make the processor perform seismic data processing methods according to various embodiments described in this section.

The disclosed exemplary embodiments provide methods and data processing apparatus performing directional designature. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration of a formation under the seafloor, the method comprising:
    receiving marine seismic data recorded by receivers towed above the formation following shots of a source;
    for each of the shots,
        calculating azimuth angles and take-off angles relative to the source for records in the marine seismic data, acquired by different among the receivers,
        obtaining a source signature related to the shot and dependent on the azimuth angles and the take-off angles, and
        applying a directional designature to the records using the source signature; and
    generating an image of the formation using data obtained by applying shot-by-shot the directional designature, to assess whether oil and/or gas reservoirs are present in the formation.

2. The method of claim 1, wherein at least one of the take-off angles is calculated using a source-side ghost delay time obtained using a bootstrap approach.

3. The method of claim 2, wherein the at least one of the take-off angles is calculated using the source-side ghost delay, $\Delta t$, a depth of the source z and a signal propagation velocity in water, $v_w$.

4. The method of claim 3, wherein the at least one of the take-off angles is calculated using the formula $$\cos \alpha = 0.5\, \Delta t\, v_w/z.$$

5. The method of claim 2, wherein mirror data for a mirror source located symmetric to the source relative to water surface is generated, and the source-side ghost delay is obtained by jointly inverting the mirror data and the marine seismic data.

6. The method of claim 1, wherein the source signature is obtained using near-field sensor measurements.

7. The method of claim 1, wherein the marine seismic data includes second records acquired by the receivers following another shot of another source, and the method further comprises:
    calculating other azimuth angles and other take-off angles for the second records;
    obtaining a second source signature for the other shot and dependent on the other azimuth angles and the other take-off angles; and
    applying directional designature to the second records using the second source signature.

8. The method of claim 1, wherein the marine seismic data is acquired as a continuous time recording, and, the marine seismic data is pre-processed to generate separate records related to each of the shots, before performing calculating, obtaining and applying steps shot-by-shot.

9. An apparatus configured for seismic exploration of a formation under the seafloor, the apparatus comprising:
    an interface configured to receive marine seismic data recorded by receivers following shots of a source; and
    a data processing unit configured, for each of the shots,
        to calculate azimuth angles and take-off angles relative to the source for records in the marine seismic data acquired by different among the receivers,
        to obtain a source signature related to the shot and dependent on the azimuth angles and the take-off angles, and
        to apply a directional designature to the records using the source signature,
    wherein the data processing unit is further configured to generate an image of the formation using data obtained by applying shot-by-shot the directional designature, for assessing whether oil and/or gas reservoirs are present in the formation.

10. The apparatus of claim 9, the data processing unit calculates at least one of the take-off angles using a source-side ghost delay time obtained using a bootstrap approach.

11. The apparatus of claim 10, wherein the data processing unit calculates the at least one of the other take-off angles using the source-side ghost delay, $\Delta t$, a depth of the source z and a signal propagation velocity in water, $v_w$ using the formula $$\cos \alpha = 0.5\, \Delta t\, v_w/z.$$

12. The apparatus of claim 9, wherein the data processing unit is configured to calculate at least one of the take-off angles using a source-side ghost delay time, the ghost time delay being obtained by generating mirror data for a mirror source located symmetric to the source relative to the water surface, and then jointly inverting the mirror data and the marine seismic data.

13. The apparatus of claim 9, wherein the data processing unit is configured to obtain the source signature using near-field sensor measurements.

14. The apparatus of claim 9, wherein the marine seismic data includes second records acquired by the receivers following another shot of another source, and the data processing unit is further configured:
to calculate other azimuth angles and other take-off angles related to the other source for the second records,
to obtain a second source signature dependent on the other azimuth angles and the other take-off angles, and
to apply directional designature to the second records using the second source signature.

15. The apparatus of claim 9, wherein the marine seismic data is acquired as a continuous time recording, and, the data processing unit is further configured to pre-process the marine seismic data to generate separate records related to each shot, before performing calculating, obtaining and applying steps shot-by-shot.

16. A computer readable recording medium non-transitorily storing executable codes, which, when executed by a computer, make the computer perform a method for seismic exploration of a formation under the seafloor using directional designature, the method comprising:
receiving marine seismic data recorded by receivers towed above the formation following shots of a source;
for each of the shots,
calculating azimuth angles and take-off angles relative to the source for records in the marine seismic data, the records having been acquired by different among the receivers following the shot,
obtaining a source signature related to the shot and dependent on the azimuth angles and the take-off angles, and
applying a directional designature to the records using the source signature; and
generating an image of the formation using data obtained by applying shot-by-shot the directional designature, to assess whether oil and/or gas reservoirs are present in the formation.

17. The computer readable recording medium of claim 16, wherein at least one of the take-off angles is calculated using a source-side ghost delay time.

18. The computer readable recording medium of claim 16, wherein the marine seismic data includes second records acquired by the receivers following another shot of another source, and the method further comprises:
calculating other azimuth angles and other take-off angles for the second records;
obtaining a second source signature for the other shot, the second signature being dependent on the other azimuth angles and the other take-off angles; and
applying directional designature to the second records using the second source signature.

19. The computer readable recording medium of claim 17, wherein mirror data for a mirror source located symmetric to the source relative to water surface is generated, and the source-side ghost delay is obtained by jointly inverting the mirror data and the marine seismic data.

20. The computer readable recording medium of claim 16, wherein the source signature is obtained using near-field sensor measurements.

* * * * *